United States Patent [19]

Dräbing et al.

[11] Patent Number: 4,884,779
[45] Date of Patent: Dec. 5, 1989

[54] MOUNT FOR ENGINE, GEARBOX OR SIMILAR PARTS OF A MOTOR VEHICLE

[75] Inventors: Walter Dräbing, Niestetal; Kurt Fiedler, Zierenberg, both of Fed. Rep. of Germany

[73] Assignee: WEGU Gummi- und Kunststoffwerke Walter Dräbing K.G., Fed. Rep. of Germany

[21] Appl. No.: 268,173

[22] Filed: Nov. 7, 1988

[30] Foreign Application Priority Data

Nov. 9, 1987 [DE] Fed. Rep. of Germany ....... 3737988

[51] Int. Cl.⁴ .......................................... F16M 13/00
[52] U.S. Cl. .................................... 248/610; 248/638
[58] Field of Search ................. 248/610, 60, 659, 638, 248/634, 635; 180/312, 299, 902, 291; 267/63 A, 153, 152

[56] References Cited

U.S. PATENT DOCUMENTS

| | | | |
|---|---|---|---|
| 1,470,493 | 10/1923 | Show | 248/610 X |
| 2,059,848 | 11/1936 | Cavitt | 248/610 X |
| 3,705,701 | 12/1972 | Hunt | 180/291 X |
| 3,977,486 | 8/1976 | Kleinschmit | 248/610 X |
| 3,979,110 | 9/1976 | Newton | 267/152 X |
| 4,415,391 | 11/1983 | Reid | 267/153 X |
| 4,449,603 | 5/1984 | Langwieder | 180/291 X |
| 4,667,764 | 5/1987 | Sawada | 180/312 X |
| 4,703,828 | 11/1987 | Mertens | 180/291 |

OTHER PUBLICATIONS

Published West German application 1,906,804 dated Dec. 17, 1964.

Primary Examiner—J. Franklin Foss
Attorney, Agent, or Firm—Thomas & Kennedy

[57] ABSTRACT

A mount for engine, gearbox or similar parts of a motor vehicle has a bearing body (1) of elastomer material, the bearing body (1) being subjected to tensile stress. In the bearing body (1), a self-contained liner (6) is provided, which is elastically deformable in the plane of the bearing body, is of extensible, resiliently compliant material and has an initially spread, unstretched initial shape. Until reaching a stretched position, the bearing body (1) alone is subjected to tensile stress. On exceeding the stretched position of the liner (6), bearing body (1) and liner (6) are subjected to tensile stress.

7 Claims, 1 Drawing Sheet

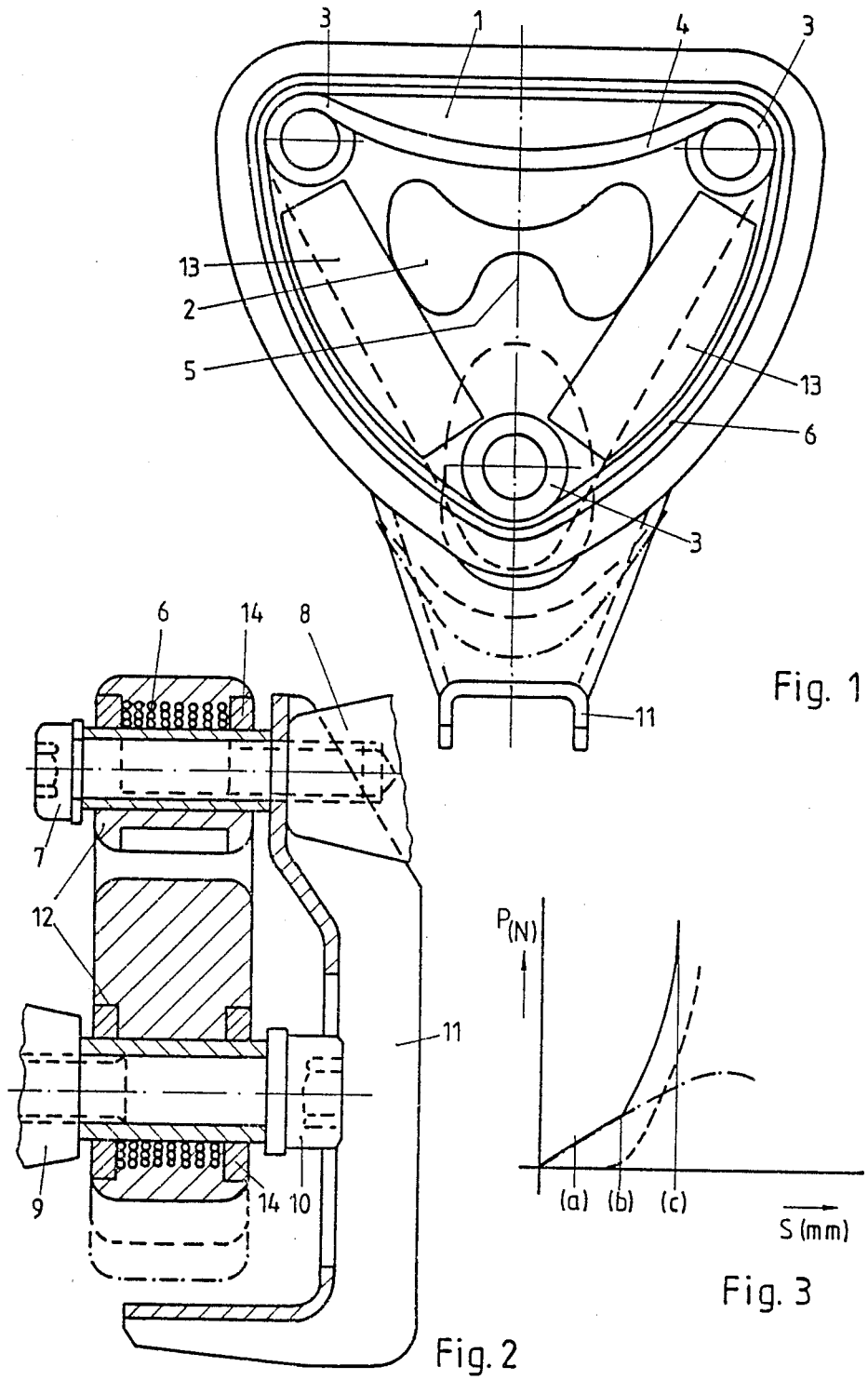

MOUNT FOR ENGINE, GEARBOX OR SIMILAR PARTS OF A MOTOR VEHICLE

FIELD OF THE INVENTION

The invention relates to a mount for engine, gearbox or similar parts of a motor vehicle, having a bearing body of elastomer material, which can be subjected to tensile stress and in which a self-contained liner is provided, which is elastically deformable in the plane of the bearing body and has an initially spread, unstretched initial shape, so that, until reaching a stretched position, the bearing body alone is subjected to tensile stress and, on exceeding the stretched position, the bearing body and the liner are subjected to tensile stress. The mount serves to support, for example, an engine of an internal-combustion machine of a motor vehicle, that is to receive comparatively heavy parts, which have to be supported vis-à-vis the vehicle compartment or the body work. The purpose here on the one hand is to insulate the transmission of structure-borne sound and other vibrations. On the other hand, a relative mobility must be possible within certain limits between engine and body work.

A mount of the type described at the beginning is known from German Utility Model No. 1,906,804. The bearing body is designed as a closed block and has two holes, which are expediently lined with metal, plastic or the like. Around these lined fixing holes there is arranged a reinforcing liner of an endless loop of yarn. In the relaxed state of the mount, this liner loosely surrounds the fixing holes. The mount may also have a triangular shape and be provided with three fixing holes. The bearing body may also be made out of several rubber blends, the liner of the loop of yarn being vulcanized-in in the material in a firmly adhering manner. The number of individual strands of the endless loop of yarn are chosen according to the desired loading of the mount. No details are given on the production and arrangement of the liner in the initially spread, unstretched initial shape. The material and the properties of the liner are also not specified more precisely, so it must be assumed that the mobility of the mount is ended on reaching the stretched position of the liner.

SUMMARY OF THE INVENTION

The invention is based on the object of further developing a mount of the type described at the beginning in such a way that, with good insulating effect against structure-borne sound transmission, greater rebound travel distances with steeper progressivity are possible and can reliably maintained.

This is achieved according to the invention by the liner consisting of extensible, resiliently compliable material and the bearing body being designed as an injection molding and having at least one inserted crude elastomer piece surrounded by injection molding material for setting out the spread, unstretched initial shape of the liner. The liner in the meantime consists of extensible, resiliently compliant material, so that, on reaching its stretched position, it does not represent a stop but allows a further rebound travel of the bearing body with appreciable spring excursion. This advantageously produces a relatively soft bearing with small rebound travel distances and a relatively hard springing with large rebound travel distances. The arrangement of the crude elastomer piece reliably provides the possibility of thereby fixing the liner in the injection mold for the bearing body in the spread, unstretched initial shape intended, so that the liner is thus molded into the elastomer material of the bearing body. The initial position is consequently fixed reproducibly.

The bearing body may have a clearance in the center. In it, at least three bushes may be embedded, the liner, in its spread, unstretched initial shape, bearing directly against the bushes and the crude elastomer piece. Consequently, the bushes may also be used for securing the spread, unstretched initial shape of the liner. It is also possible to arrange more than three bushes, which in each case form supporting or suspension points. In spread, unstretched initial shape, the liner is taken around these bushes, the forces which are assumed by the liner being transmitted directly onto the bushes and not having first to be directed through the elastomer material of the bearing body. In the case of small rebound travel distances, the liner is stress-free and the complete stress load is assumed by the elastomer material of the bearing body.

The bearing body has, in the region of each bush, a suspension point and the liner may have, in the spread initial position, approximately heart-shaped form. This represents the unstretched position. In the stretched position, the line represents the shape of a triangle, with corners rounded off around the bushes.

The resiliently compliant liner of an, in particular, multi-layered yarn loop of a yarn may consist of natural materials such as cotton, silk or the like and/or of plastic. Such resiliently compliant yarns are known from other fields of technology.

The bearing body and the liners have spring excursions of a similar order of magnitude, i.e. the liner as well has an appreciable spring excursion, in which it lengthens elastically. The liner has, furthermore, also a corresponding recovery.

A process for producing a mount having a bearing body operates with an injection mold and is defined according to the invention by at least one crude elastomer piece being introduced in stable position into the injection mold, the liner being placed over the crude elastomer piece and thereby spread out, and the inserted parts being surrounded by injected elastomer material. Of course, several crude elastomer pieces may also be inserted into the injection mold. Wherever rubber is used as elastomer material, a vulcanization follows in a known way. In the production of the bearing body, side cover pieces may also be inserted into the injection mold, in order to secure the central, symmetrical placement of the liner. In the injection mold, at least additionally three bushes may be introduced and the liner spread out over the crude elastomer piece and the bushes.

BRIEF DESCRIPTION OF THE DRAWINGS

The invention is further illustrated and described with reference to a preferred exemplary embodiment. In the drawing:

FIG. 1 shows a front view of essential parts of the mount,

FIG. 2 shows a side view of the mount, partially in section, and

FIG. 3 shows a characteristic diagram.

DETAILED DESCRIPTION

Essential component of the mount is a bearing body 1 of elastomer material, that is in particular rubber, plastic or the like. The bearing body 1 has approximately annular form and can, as shown, be of compactly triangular design. In the center it has a clearance 2. Embedded in the material of the bearing body are three bushes 3, it being possible for the two upper bushes to be interconnected or mutually supported by a metal support yoke 4. This metal support yoke 4, inter alia, reinforces the bearing body 1, which has in the region adjoining the clearance 2 a protuberance 5, so that in this way a limitation against compression movements is formed. The bushes 3 are directly surrounded by a liner 6, which may be designed as a loop assembly and bears directly against the bushes 3. In the produced unloaded form, or also in the static loading position, as shown by solid lines, the liner 6 has a spread, unstretched initial shape, so that in the case of small rebound movements initially the elastomer material of the bearing body 1 can alone absorb the tensile forces. As evident in particular from FIG. 2, the two upper bushes 3 are connected by means of screws 7 to a vehicle frame 8 or the self-supporting bodywork, while the lower bush 3 is passed through by a screw 10 acting on an engine, gearbox or the like 9. The part to be suspended is thus here actually mounted in a suspended manner, so that the bearing body 1 is subjected to tensile stress. A limiting piece 11 may be provided as a mechanical safety device, in order to take up the engine 9 and to support it for emergency operation if the bearing body 1 is damaged or in another way destroyed.

It is important to appreciate that the liner 6 initially has a spread, unstretched initial shape and is only transformed into the stretched bearing at the transition between small and large rebound movements, from which it can then still execute an elastic extension with an appreciable spring excursion. This is also illustrated by FIG. 3. The position a shows the static initial position represented by solid lines in FIGS. 1 and 2. It is followed by a range of small rebound movements, which ends approximately in position b, in which the liner 6 assumes its stretched position. Between the positions a and b, the elastomer material of the bearing body 1 alone is subjected to tensile stress, while subsequently, in the range of greater rebound movements, the liner 6 is also additionally subjected to tensile stress. Indicated in dashed lines in FIGS. 1 and 2 is the lowering of the lower region of the bearing body 1 according to position b. Position c is illustrated by dot-dashed lines. It can be seen that the characteristic according to FIG. 3 has a considerable progressivity between positions b and c. The dot-dashed line in FIG. 3 is the characteristic of the bearing body 1 of elastomer material alone. The dashed line represents the characteristic of the liner 6 and the solid line shows the sum of these two characteristics, that is the characteristic of the bearing body 1. It is also evident from FIG. 3 that, in the range in which the liner 6 is elastically lengthened and shortened, considerable spring excursions are covered, which are approximately of the same order of magnitude as the spring excursions covered in the range of small rebound movements between the positions a and b.

The bearing body 1 is expediently produced with the aid of an injection mold. Into this injection mold is first inserted a side cover part 12. Subsequently, the bushes 3 and the support yoke 4 are positioned in stable position. Then, the liner 6 is placed around the bushes 3 and, by the additional insertion of crude elastomer pieces 13, taken back into the spread, unstretched initial position similar to FIG. 1. At the same time, the liner 6 is also held centrally (FIG. 2). Finally, a further side cover piece 14 is put in place and the injection of elastomer material around these inserted parts takes place in the injection mold.

List of reference numerals:

1 = Bearing body
2 = Clearance
3 = Bush
4 = Support yoke
5 = Protuberance
6 = Liner
7 = Screw
8 = Vehicle frame
9 = Engine
10 = Screw
11 = Limiting piece
12 = Side cover part
13 = Crude elastomer piece
14 = Side cover part

We claim:

1. A mount for supporting an engine, gearbox or similar parts of a motor vehicle, said mount comprising a first load bearing means comprising a bearing body of elastomer material being elastically deformable in a plane of said bearing body and being constructed to support a load up to a predetermined amount placed upon said mount, and a second load bearing means comprising an extensible, resiliently compliant liner being elastically deformable in said plane and being mounted within said bearing body in a configuration that permits said bearing body to change shape in response to an increasing load applied to said bearing body substantially without said liner bearing any of the load until said liner assumes a stretched configuration, whereupon a further load applied to said mount causes said liner to elongate and bear part of the load applied to said mount.

2. The mount as claimed in claim 1, wherein said bearing body (1) has a center clearance (2) formed therein and in said body at least three bushes (3) are embedded in a triangular relationship, and wherein said liner (6) is loosely draped about said bushes (3) when no load is applied to said mount.

3. The mount as claimed in claim 2 wherein said liner (6) has an approximately heartshaped form when said mount is not supporting a load.

4. The mount as claimed in claim 1 wherein said resilient compliant liner (6) comprises of a multi-layered yarn loop of a yarn of natural materials such as cotton, silk or the like.

5. The mount as claimed in claim 1, wherein the bearing body (1) and the liner (6) have spring excursions of a similar order of magnitude.

6. The mount as claimed in claim 1 wherein said liner is at least partly made of plastic.

7. A mount for supporting an engine, gearbox or the like of a motor vehicle comprising:
   a bearing body of molded elastomer material, bushes embedded in said bearing body in parallel, triangular spaced relationship in a common plane with at least one bush for mounting to the vehicle and another bush for mounting to the engine or the like,
   an extensible resiliently compliant liner mounted within said bearing body in said plane and surrounding said bushes in an approximately heart-shaped configuration, said bearing body being elastically deformable in said plane in response to a load carried by said bushes applying tensile stress to said bearing body, and said liner being deformable in shape to a stretched approximately triangular configuration in response to a load carried by said bushes up to a predetermined load and elastically extensible in response to a load carried by said bushes beyond the predetermined load.

* * * * *